(12) United States Patent
Borisenko

(10) Patent No.: US 7,553,354 B2
(45) Date of Patent: Jun. 30, 2009

(54) APPARATUS AND METHOD FOR REDUCING AND REMOVING AIRBORNE OXIDIZED PARTICULATES

(75) Inventor: Alexander Vasilievich Borisenko, Karaganda (KZ)

(73) Assignee: Absalut Ecology Establishment, Schaan (LI)

( * ) Notice: Subject to any disclaimer, the term of this patent is extended or adjusted under 35 U.S.C. 154(b) by 534 days.

(21) Appl. No.: 10/595,847

(22) PCT Filed: Nov. 12, 2004

(86) PCT No.: PCT/IB2004/003722

§ 371 (c)(1),
(2), (4) Date: May 16, 2006

(87) PCT Pub. No.: WO2005/046877

PCT Pub. Date: May 26, 2005

(65) Prior Publication Data

US 2007/0144345 A1    Jun. 28, 2007

(30) Foreign Application Priority Data

| Nov. 17, 2003 | (KZ) | 2003/1474 |
| Nov. 17, 2003 | (KZ) | 2003/1475 |
| Dec. 1, 2003 | (KZ) | 2003/1635 |
| Dec. 10, 2003 | (KZ) | 2003/1686 |
| Jun. 28, 2004 | (KZ) | 2004/0911 |
| Jun. 30, 2004 | (KZ) | 2004/0924 |

(51) Int. Cl.
  *B03C 3/40* (2006.01)
(52) U.S. Cl. .......... 96/39; 55/DIG. 38; 96/45; 96/61; 96/62; 96/63; 96/69; 96/94; 96/97; 96/98; 96/99
(58) Field of Classification Search .......... 96/39, 96/45, 60–63, 69, 94, 97–100; 55/DIG. 38
See application file for complete search history.

(56) References Cited

U.S. PATENT DOCUMENTS 1,130,212 A * 3/1915 Steere .......... 95/81

(Continued)

FOREIGN PATENT DOCUMENTS

DE    101569 A1    11/1973

(Continued)

*Primary Examiner*—Richard L Chiesa
(74) *Attorney, Agent, or Firm*—Brooks Kushman P.C.

(57) ABSTRACT

An apparatus (10) and method for recovering elemental carbon, elemental sulfur, elemental iron, elemental gold and other elemental materials from an air flow including a funnel-shaped receptor (14) and an inverted cone-shape electrode node body (12) spaced from the funnel receptor, a funnel-shaped reaction zone (45) between the outer surface of the electrode node body and the inner surface (60) of the receptor for receiving the air flow, and a plurality of point source electrodes (36) mounted to the electrode node body (12) and projecting into the reaction zone (45). The electrode node body (12) and the receptor (14) are electrically isolated from each other, the receptor (14) is connected to ground, and a voltage source is electrically connected to the electrode node body (12). The apparatus and method may be used for treating an air flow containing pollutants generated from the burning of fossil fuels, trash and other materials to reduce the oxides to elemental matter and water and to remove the elemental matter from the air flow, for treating emissions of coal-operated power plants to improve their efficiency by recovering carbon from the plant emissions and reusing the recovered carbon as fuel, to reduce landfill requirements by burning trash in incinerators and treating the incinerator emissions to recover elemental material which is then landfilled in far less space than the original unburned trash, and to produce valuable elemental material such as fullerenes.

28 Claims, 6 Drawing Sheets

U.S. PATENT DOCUMENTS

| | | | | |
|---|---|---|---|---|
| 1,357,202 A | * | 10/1920 | Nesbit | 96/75 |
| 2,081,772 A | * | 5/1937 | Saint-Jacques | 95/63 |
| 3,124,437 A | * | 3/1964 | Lagarias | 95/75 |
| 3,238,702 A | * | 3/1966 | De Seversky | 96/45 |
| 3,492,790 A | * | 2/1970 | Ebert | 96/39 |
| 3,526,081 A | * | 9/1970 | Kusters | 96/61 |
| 3,765,154 A | * | 10/1973 | Hardt et al. | 96/88 |
| 3,768,258 A | * | 10/1973 | Smith et al. | 60/275 |
| 3,890,103 A | | 6/1975 | Konishi | |
| 4,010,011 A | * | 3/1977 | Reif | 96/61 |
| 4,478,613 A | * | 10/1984 | Brettschneider et al. | 96/61 |
| 4,657,738 A | | 4/1987 | Kanter et al. | |
| 4,689,951 A | * | 9/1987 | Polach | 60/275 |
| 4,818,355 A | | 4/1989 | Kanter et al. | |
| 5,066,316 A | | 11/1991 | Ikeda | |
| 5,254,155 A | * | 10/1993 | Mensi | 96/44 |
| 5,626,652 A | * | 5/1997 | Kohl et al. | 96/45 |
| 6,228,148 B1 | * | 5/2001 | Aaltonen et al. | 95/74 |
| 6,294,003 B1 | * | 9/2001 | Ray | 96/49 |
| 6,508,861 B1 | * | 1/2003 | Ray | 95/79 |
| 6,656,248 B2 | * | 12/2003 | Ilmasti | 95/74 |
| 6,663,696 B1 | * | 12/2003 | Miller et al. | 96/88 |
| 2002/0017194 A1 | * | 2/2002 | Stivers | 96/61 |
| 2006/0249025 A1 | * | 11/2006 | Clark et al. | 96/44 |

FOREIGN PATENT DOCUMENTS

| | | | | |
|---|---|---|---|---|
| JP | 52-13175 A | * | 2/1977 | 96/97 |
| JP | 52-74961 A | * | 6/1977 | 96/61 |
| JP | 05186209 A | | 7/1993 | |
| SU | 633607 A | | 11/1978 | |
| SU | 1017383 A | | 5/1983 | |

* cited by examiner

 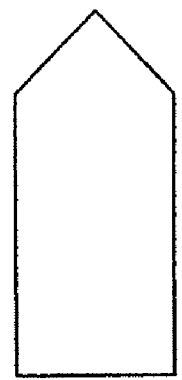
FIG. 6A     FIG. 6B
 
FIG. 6C     FIG. 6D
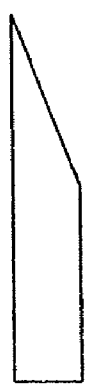 
FIG. 6E     FIG. 6F

APPARATUS AND METHOD FOR REDUCING AND REMOVING AIRBORNE OXIDIZED PARTICULATES

CROSS-REFERENCE TO RELATED PATENT APPLICATIONS

This application claims priority of the following Republic of Kazakhstan patent applications: application number 2003/1474.1, filed Nov. 17, 2003, now preliminary patent number 14236; application number 2003/1475.0, filed Nov. 17, 2003, now preliminary patent number 14237; application number 2003/1635.1, filed Dec. 1, 2003, now preliminary patent number 14238; application number 2003/1686.1, filed Dec. 10, 2003, now preliminary patent number 14312; application number 2004/0911.1, filed Jun. 28, 2004; and application number 2004/0924.1, filed Jun. 30, 2004.

FIELD OF THE INVENTION

This invention relates to apparatus and methods for reducing airborne oxidized particulates and, more particularly, to apparatus and methods for treating an air flow containing pollutants generated from the burning of fossil fuels, waste, etc., to reduce the oxides to elemental material and water, and to remove elemental material from the air flow. The apparatus and methods of the present invention also make possible the recovery from an air flow of useful elemental materials, such as elemental carbon (including fullerenes), elemental sulfur, elemental iron, elemental gold, etc.

BACKGROUND OF THE INVENTION

Our environment is becoming increasingly contaminated both due to a variety of different natural phenomena and due to the introduction of man-made pollutants into the air and water by industrial nations around the globe. Common examples of man-made pollutants introduced into the air include airborne particulates produced by combustion in hydrocarbon-burning power plants, incinerators, industrial processes of various kinds like smelting operations, nitric and sulfuric acid plants, internal combustion engines, etc. For the most part, such pollutants comprise oxidation products of carbon, sulfur, nitrogen, lead, zinc, and other elements. For example, since coal includes traces of various impurities, including lead, zinc, silver, etc., when coal is burned the carbon in the coal as well as these impurities are oxidized. Finally, the sulfur oxides and nitrogen oxides produced from the combustion of fuels containing sulfur compounds and the combustion of fuels that contain nitrogen compounds form acids that contribute to acid rain, an increasingly significant environmental concern.

Many approaches have been developed to treating the combustion products of hydrocarbon-burning power plants, incinerators, industrial processes, internal combustion engines, etc. to control the introduction of airborne particulates from these sources. For example, coal-burning power plants often employ scrubbing processes that use calcium compounds that react with sulfur oxides to form gypsum. Unfortunately, the substantial amounts of waste products produced by such scrubbing processes present serious disposal problems. Where possible, low-sulfur coals are used in coal-burning power plants to reduce scrubbing requirements, but this increases the costs of power generation. Alternatively, sulfur oxide emissions are reduced by operating the plants at lower temperatures, but this leaves some of the heating value of the coal untapped.

Another approach to treating such emissions has been to use electrostatic precipitators to enhance the removal of particulates. In this approach various types of ionizers are used to create ions that attach themselves to the particulates. The resulting charged particulates are then collected as such in an electrostatic precipitator.

Unfortunately, the prior approaches to controlling the introduction of combustion-produced airborne particulates have met with one or more serious problems. For example, they have not been able to reduce emissions to acceptable levels, they have been inordinately expensive to build or operate, and they have been energy inefficient.

The present invention provides apparatus and methods for treating an air flow containing particulate combustion products to reduce them to elemental material and water. The apparatus and methods of the invention also provide means for removing the elemental material, leaving a cleansed and greatly improved air flow and making it possible to recover valuable elemental materials where desired. Finally, the present invention achieves all of these objectives in a highly energy-efficient manner.

Fullerenes are one of the valuable elemental materials that can be recovered using the apparatus and method of the present invention. Fullerenes are a very dear and industrially important form of carbon comprising a large closed-cage molecule made up of 60 or more $sp^2$-hybridized carbon atoms, arranged in hexagons and pentagons. Currently, fullerenes are known in the form of spheriods ("buckminsterfullerene") and cylindrical or torroidal shapes ("nanotubes"). Various complex and expensive processes are known for producing fullerenes. Because the processes are so complex, and the yields so low, the resulting product is very, very expensive. The present invention provides a far more efficient and inexpensive method for producing these materials.

Since the apparatus of the present invention operates on only a small amount of energy, when the apparatus is used to treat the emissions of a coal-operated power plant, carbon may be recovered from the plant's smokestack and repeatedly re-used to fuel combustion, greatly enhancing the efficiency of the power plant.

Finally, the present apparatus is also useful in reducing landfill requirements. For example, since the invention is so efficient in cleaning the air, it makes possible the use of incinerators which have been heretofore banned or discouraged because of the difficulty of effectively controlling the air pollution that they produce. Thus, many materials that otherwise would be incinerated have been land-filled, unnecessarily wasting substantial landfill area. If such materials could be burned in incinerators and treated in the present apparatus this would greatly reduce the volume of the remaining material (primarily the collected elemental material) which could then be land-filled, taking up substantially less landfill area. Furthermore, already buried landfill material may be mined, incinerated, treated in accordance with the present invention and returned to the landfill to greatly reduce the volume of the mined landfill, substantially extending the lifetime of the landfill.

SUMMARY OF THE INVENTION

The present invention comprises an apparatus and method for treating an air flow containing particulates and/or oxidized compounds of carbon, sulfur, iron and other elements. The apparatus and method utilize a receptor having an inner surface, and an electrode node having a body with an outer surface spaced from the inner surface of the receptor to define a reaction zone between the outer surface of the body and the inner surface of the receptor. A plurality of electrically conductive point source electrodes project from the body of the electrode node into the reaction zone. The electrode node and the receptor are electrically isolated from each other and the inner surface of the receptor is connected to ground. A voltage source is electrically connected to the electrode node. Finally, means for introducing an air flow into the reaction zone is provided, for treating the air flow to remove the particulates and oxidized compounds.

The apparatus and method may be used for a variety of different purposes. For example, the apparatus and method may be used for treating an air flow containing pollutants generated from the burning of fossil fuels, trash and other materials to reduce the oxides to elemental material and water and to remove the elemental material from the air flow. Also, the apparatus and method may be used for treating emissions of coal-operated power plants to improve their efficiency by recovering carbon from the plant emissions and reusing the recovered carbon as fuel. The apparatus and method may be used to reduce landfill requirements by burning waste in incinerators and treating the incinerator emissions to recover elemental material which is then landfilled in far less space than the original unburned waste. Additionally, the apparatus and method may be used with mined landfill material which is incinerated, treated to recover elemental material and returned to a landfill as recovered elemental material of a far reduced volume. Finally, the apparatus and method may be used to produce valuable elemental material such as fullerenes.

BRIEF DESCRIPTION OF THE DRAWINGS

The features of this invention which are believed to be novel are set forth with particularity in the appended claims. The invention, together with its objects and advantages, may be best understood by reference to the following description, taken in conjunction with the following drawings, in which like reference numbers identify like elements in the several figures and in which:

FIGS. 6A-6F illustrate alternative embodiments of the point source electrode tip.

DETAILED DESCRIPTION OF PREFERRED EMBODIMENTS OF THE INVENTION

Figure 1:
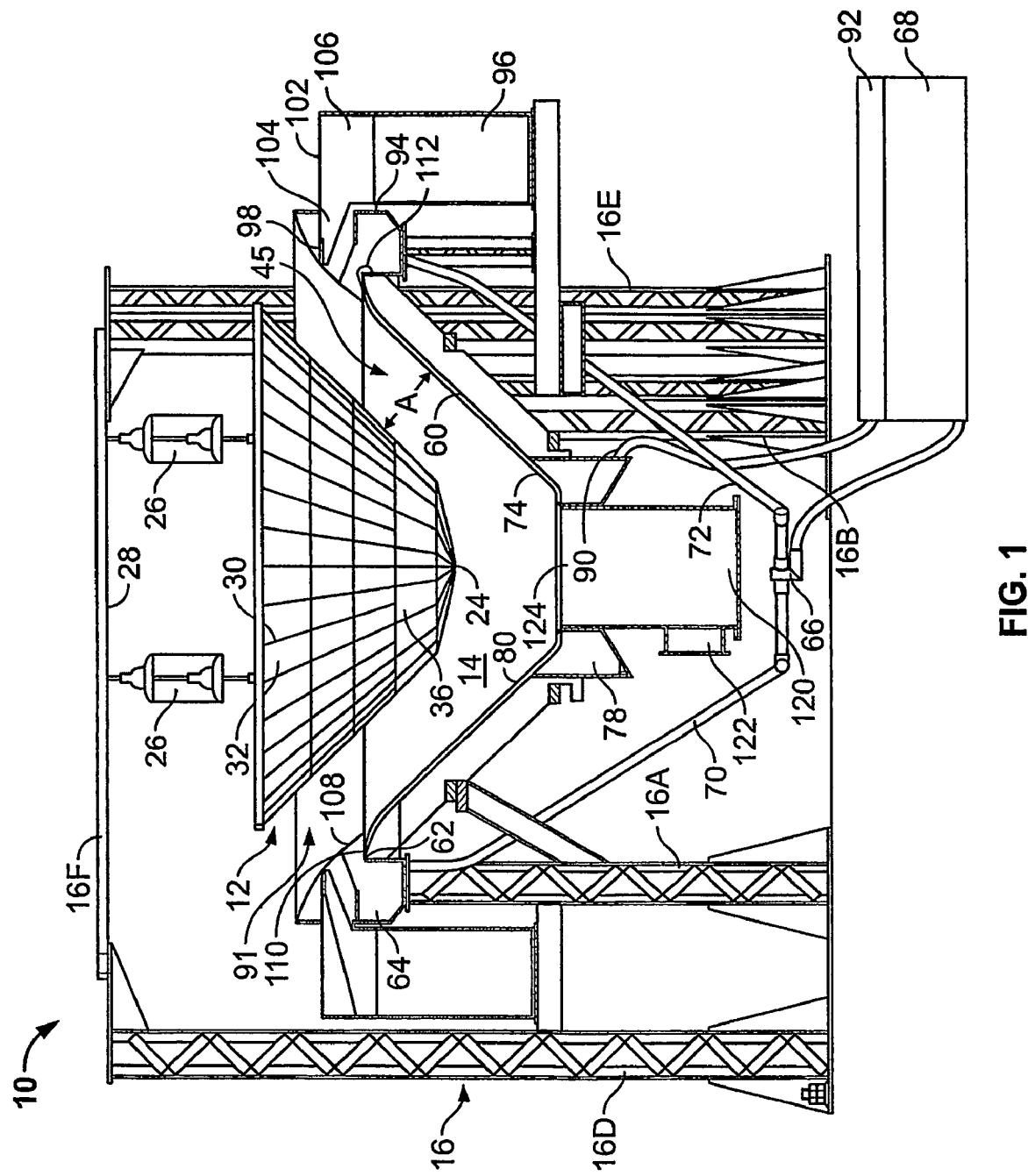
FIG. 1 is a front elevation view of an apparatus for treating an air flow containing airborne oxidized particulates in accordance with the present invention.
Figure 2:
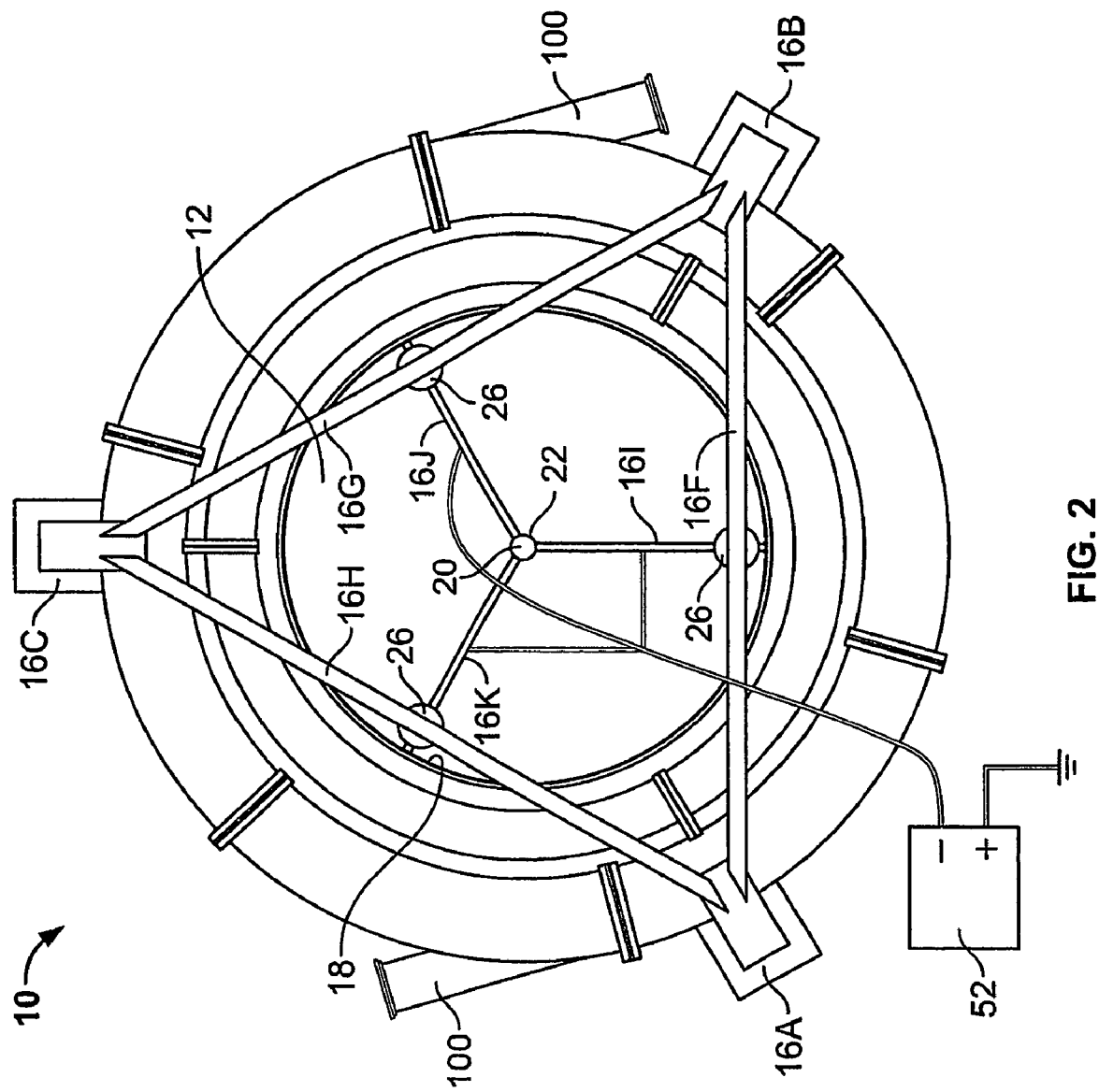
FIG. 2 is a top plan view of the apparatus of FIG. 1.

Turning first to FIGS. 1 and 2, an apparatus 10 in accordance with the present invention is illustrated. Apparatus 10 includes an electrode node body 12 having an inverted cone-shape, suspended above and spaced from a funnel-shaped receptor 14. The electrode node body and receptor are affixed to a support structure 16 disposed about the cone and funnel comprising inter alia a series of support beams 16A-16E and generally horizontal members including beams 16F-16H and other attachment members, as appropriate, for holding the electrode node body, receptor and other components of the system in place. A series of three generally horizontal support bars 16I-16K are attached to the interior of electrode node body 12 along its inside top periphery 18. The three support bars are also joined to a common center 20 (FIG. 2) from which a central support 22 projects downwardly into the interior of the electrode node body and is attached to the back of the distal tip 24 of the injector. Support bars 16I-16K and central support 22 are made of an electrically conductive material.

Electrode node body 12 is electrically isolated from the system by suspending the body from horizontal members 16F, 16G and 16H by a series of insulators 26 which are attached to the bottom side 28 of horizontal members 16F, 16G and 16H and to support bars 16I, 16J and 16K.

Figure 3A:
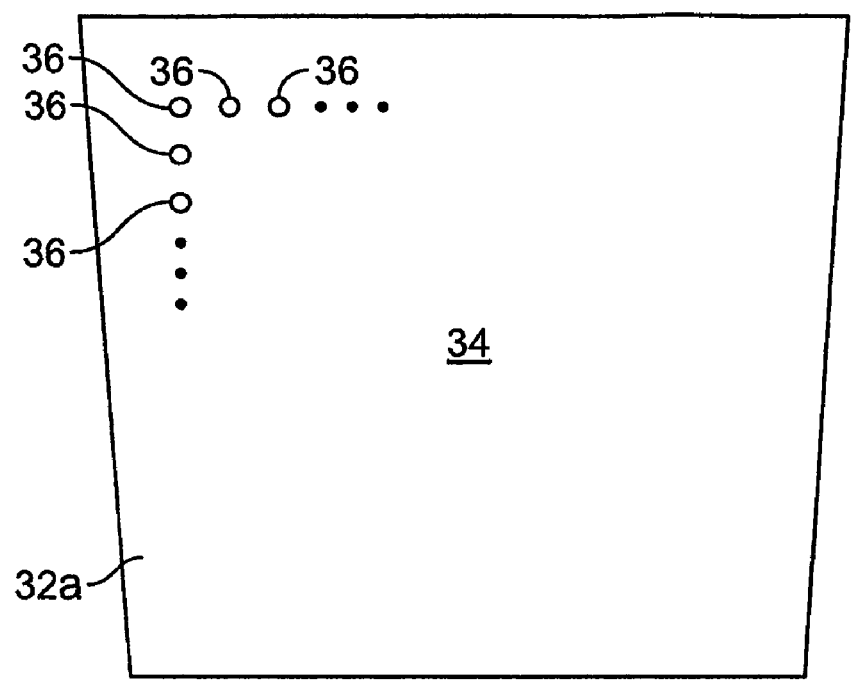
FIGS. 3A and 3B are respectively a front elevation and a side elevation view of a rubber tile of the electrode node body of the apparatus of FIG. 1.
Figure 3B:
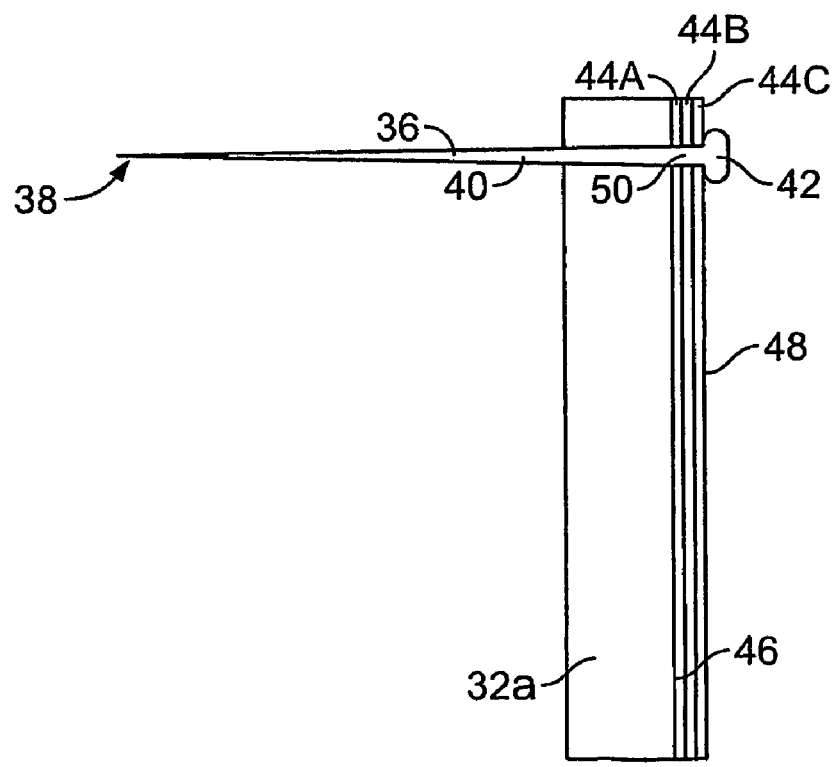
Figure 4A:
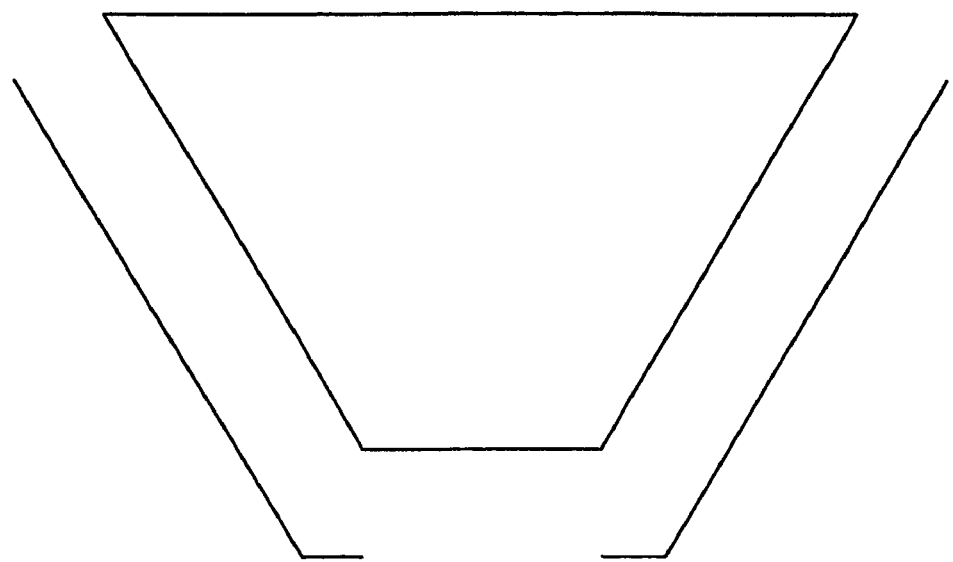
FIGS. 4A, 4B and 4C are diagrammatic representations of the preferred (FIG. 4A) and different possible shapes of the electrode node body and corresponding receptor (FIGS. 4B and 4C)
Figure 4B:
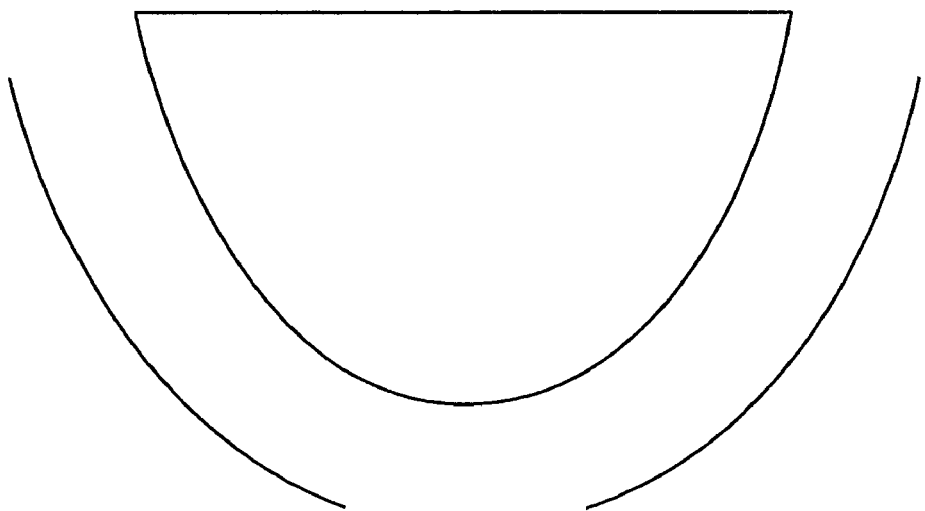
Figure 4C:
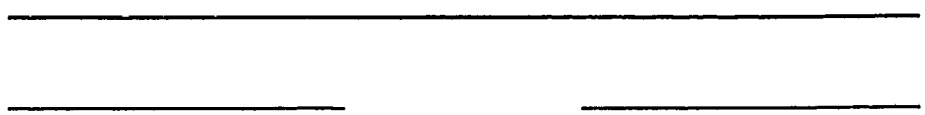

Electrode node body 12 comprises a series of interconnected aluminum frames 30 sized and shaped appropriately to produce the desired conical body shape. Rubber tiles 32 are mounted in these frames to form a continuous cone structure. A representative tile 32a is illustrated in FIGS. 3A and 3B. The front surface 34 of tiles 32 form the outer surface of the electrode node body and are generally smooth, with a series of point source electrodes in the form of sharply-pointed needles 36 projecting from the surface of the tiles. These needles include a sharp, pointed tip 38, a shaft 40 and an expanded base 42. They must be electrically conductive and, preferably, will be made of stainless steel or another electrically conductive material that resists corrosion and can take and maintain a fine, sharp tip 38. In the presently preferred embodiment, stainless steel needles intended for placement in hypodermic syringes are used.

The inside of electrode node body 12 is covered with at least one sheet of an electrically conductive material such as aluminum foil. In the present embodiment, three layers of aluminum foil 44A, 44B and 44C are applied to the inner surface of the electrode node body, adjacent the back wall 46 of the tiles (and frames) with an appropriate adhesive such as polyurethane glue between the back walls 46 and the front of the first foil sheet 44A and then between the successive abutting surfaces of foil sheets 44A, 44B and 44C.

Needles 36 are electrically interconnected by driving them through foil sheets 44A, 44B and 44C and then through the rubber tiles until the expanded base 42 of the needles abuts the exposed back surface 48 of foil sheet 44C. Since all of the needles are attached in this manner, electrical continuity is achieved between all of the needles and the foil sheets through the electrical contact between expanded base 42 and foil sheet 44C as well as the electrical contact between the base portion 50 of the needle shaft and the three foil layers. In assembling the apparatus it is preferred that the electrical continuity between each of the needles and the foil be checked with an appropriate conductivity meter, to ensure that all of the point source electrodes are integrated in a common electrical circuit.

While only a few needles are shown protruding from injector tile 32a, in practice the outer surface of electrode node body 12 is covered with myriad protruding needles preferably evenly spaced across the front surface of each of the tiles. While the actual spacing of the needles can vary as desired, it is presently preferred that an electrode node body having an inverted cone-shape with a surface area of about 22 $m^2$ will have approximately 17,000 needles of about 0.35 mm diameter projecting from its surface, spaced at about 22 mm between adjacent needles. While fewer or greater numbers of needles may be used as needed, it is believed, that the greatest efficiency is achieved with the greatest practical number of needles. Currently a spacing of no less than about 20 mm and no more than about 45 mm is believed to be optimal. Also, in the illustrated embodiment, the tiles are about 4 cm in thickness, and the needle shafts protrude about 40 mm from the front surface of the tiles.

The point source electrodes 36 used in the present invention bear special attention. While in the preferred embodiment of FIGS. 1-2 these point source electrodes are shown to be hypodermic needles, they may be of any structure that includes a sharp point at its distal end. The shafts maybe round, flat, triangular, rectangular, etc., as desired. A non-limiting selection of such structures is shown in FIGS. 6A-6F. In all cases, at least the distal end of the shaft has a taper leading up to the tip and the tip comes to a single sharp point. The angle of the taper may vary but as sharp a taper angle as possible is preferred. Appropriate point source electrodes will be observed in the dark to produce a luminous discharge surrounding the tip when, as described below, the electrical potential is applied and the tip is disposed in the air flow.

Needles 36 are provided with an electrical potential by electrically connecting a voltage source such as a transformer 52 to electrically conductive support bars 16I-16K which in turn are electrically connected to the back of the injector, to the foil and hence to the needles. While the negative lead of the transformer is shown connected to the injector and the positive lead to ground (which is preferred), these leads may be switched if desired. Any conventional electrical transformer can be used. It is preferred that the transformer produce a voltage in the range of about 10-3000 kV through a rectifier. In the illustrated embodiment, a transformer producing 300 kV DC and 250 mA is used. The potential may be constant or may be varied commensurate with the nature of the particulates in the air flow, the rate of flow of the air flow, etc.

Turning now to funnel-shaped receptor 14, it is seen that the receptor includes a continuous conical inner inclined surface 60. The outer edge 62 of the receptor is encircled by an annular trough 64. Water is continuously supplied to the trough during the operation of the apparatus by a pump 66 drawing water from a reservoir 68 and delivering the water to trough 64 through supply tubes 70 and 72 so that the water in the trough spills over the outer edge 62 of the receptor covering the entire inner inclined surface of the receptor with a continuous film 74 of water. Since it is preferred that the entire surface of the receptor be coated with the film of water during the operation of the apparatus, the receptor is maintained at as level a condition as possible so that the water falling over the outer edge does so evenly about the entire surface of the funnel-shape. In the operation of the illustrated embodiment, pump 66 supplies water to the trough at a rate of about 600 $m^3$ per minute.

Receptor 14 in the illustrated embodiment is about 5 meters across at its outer edge 62 and about 2 meters in height. Inner inclined surface 60 of receptor 14 is set at an angle of about 45° and is spaced a distance A of about 0.5 meters from the outer surface of inverted cone-shaped electrode node body 12, creating a funnel-shaped air treatment region or reaction zone 45 between the cone and funnel surfaces. This spacing may be adjusted as necessary or desired to optimize the operation of apparatus 10. Indeed, conventional manual or motorized means may be provided (not shown) to move the electrode node body 12 up and down with respect to the receptor 14 (and/or the receptor with respect to the electrode node body) in order to vary this spacing.

Additionally, it is preferred that the water-carrying inner surface 60 of the receptor be covered by an insulating coating such as an epoxy coating 80 which in the illustrated embodiment is about 6 mm in thickness and filled with dielectric particles. Preferably, this insulating coating extends around the lip at the top edge of the receptor. It is further preferred that this coating be highly polished to facilitate surface coverage by the water film and to maximize the rate of flow of the water film down continuous conical inner inclined surface 60 of the funnel receptor. Notwithstanding this insulating coating, the water film is electrically grounded as will be described below.

While particular electrode node body and receptor configurations are illustrated in the embodiment of the invention of FIGS. 1-2 (and in the corresponding diagrammatic representation of FIG. 4A), other configurations may be used. For example, the electrode node body and receptor may by bowl shaped as in the diagrammatic representation of FIG. 4B or they may be otherwise shaped. It is preferred, however, that the corresponding electrode node body and receptor surfaces be substantially parallel to or equidistant from each other and that the electrode node body and receptor be symmetrically disposed about a common axis. Also, in alternate, presently less preferred embodiments, the electrode node body and receptor may be simply flat surfaces (FIG. 4C) carrying myriad point source electrodes as described above with the space between the flat surface constituting the reaction zone.

After the water travels down inner inclined surface 60 of the receptor, it is collected in an annular gutter 78 and flows from the gutter through an outlet 90 to reservoir 68 from which the water is drawn by pump 66 after passing through a filter 92. Gutter 78 is electrically conductive to ensure that the water film is electrically grounded. While filter 92 is shown diagramatically, any conventional filtering means may be used. For example, an air flotation system may be used whereby lighter-than-water materials collected in the reservoir (like carbon particles, fullerenes, etc.) are skimmed off the top of the reservoir leaving clean water for return to the receptor. In the illustrated embodiment, reservoir 68 holds about 3000 liters of water.

The present apparatus is intended to treat an air flow containing oxidized particulates that is introduced into funnel-shaped reaction zone 45 between the electrode node body and receptor surfaces. The air flow may be introduced into the air treatment region from different locations in the apparatus. For example, an annular air chamber 96 may be disposed about the outer edge 94 of annular trough 64. This chamber will include one or more inlets 100 (FIG. 2) preferably oriented, as shown, to direct the airflow in an annular fashion about the air chamber. Air chamber 96 has at its top 102 a radially inwardly-directed annular nose portion 104 juxtaposed above trough 64. The top 106 of annular air chamber 96 has an annular opening 98 from which the air flow entering air chamber 96 is ejected. A deflector panel 108 is provided encircling the trough above opening 98. Deflector panel 108 is spaced from the inner inclined surface 60 of the receptor to provide an annular opening 110 just above the outer edge 62 of the funnel. In the illustrated embodiment, this cavity is about 6 cm across. In a preferred embodiment, a guard 112 (shown enlarged) is positioned just above edge 62 of the funnel to prevent the entering air flow from interfering with the flow of water onto the inner surface of the funnel.

The air flow containing oxidized particulates is preferably supplied to air chamber 96 under a positive head of pressure. An air pump (not shown) is used to accelerate the air flow so that it enters the chamber under a pressure of about 70 mm water column.

In an alternate embodiment, the air flow containing oxidized particulates may be provided to a central air chamber 120 having an inlet 122 and an outlet 124. When the air flow is supplied to this central air chamber, it enters reaction zone 45 from the lower part of the funnel-shaped receptor, preferably pressurized as described above. This air flow moves through the reaction zone contacting needles 36 protruding from the electrode node body as described earlier.

Figure 5:
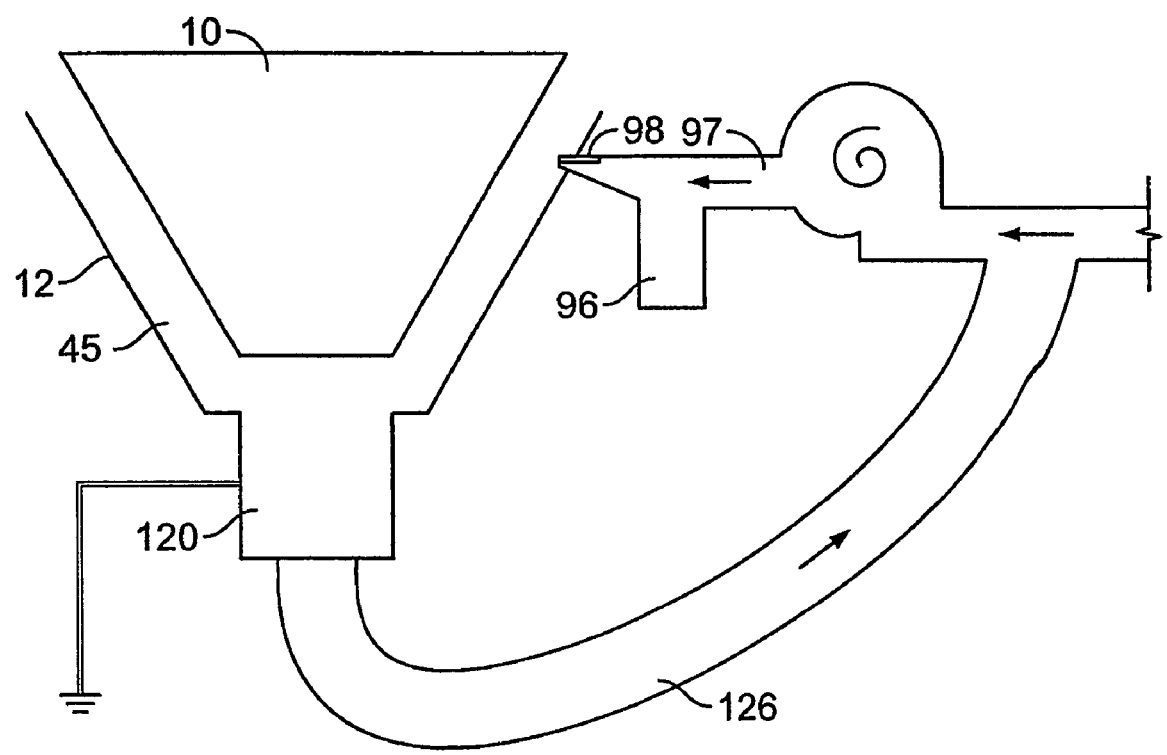
FIG. 5 is a diagrammatic representation of an embodiment of the invention in which the treated air flow is recirculated to improve the system effectiveness.

In another alternate embodiment, means are provided for recirculating the air flow passing through reaction zone 45 in order to improve the efficiency of the system. This may be accomplished, for example, as illustrated diagrammatically in FIG. 5 where a portion of the already treated air flow in reaction zone 45 is drawn off of the bottom of the receptor through central air chamber 120 under the action of air pump 126 and returned to air reservoir 96 for reintroduction into the reaction zone.

The operation of the apparatus proceeds as follows:

A. Transformer 52 is turned on to produce the desired voltage at needles 36.

B. A continuous film of water on the inner surface of the receptor is started by turning on pump 66.

C. An air flow containing oxidized particulates including, for example, carbon oxides, sulfur oxides, lead oxides, zinc oxides, iron oxides, and silver oxides is introduced through inlets 100. Where apparatus 10 is used to directly treat a high temperature air flow it is preferred that the air flow be cooled by any conventional means to a temperature of at least about 60° C.

D. The air flow fills annular air chamber 96 and exits annular opening 98, traveling through reaction zone 45, where the air rises to interact with the needle tips protruding from the outer surface of the electrode node body. The air entering the space between the electrode node body and the receptor is accelerated to enhance the interaction between the point source electrodes (needle tips) and the oxidized particulates as a result of the interaction of oxidized particulates and the point source electrodes of the injector. The oxidized particulates in the air flow are converted to elemental carbon, sulfur, lead, zinc and silver by the action of the point source electrodes and drop into water film 74 on the inner inclined surface 60 of the funnel, and are carried off to reservoir 68. Once removed by filter 92, the elemental material may be separated, discarded, processed, etc., as desired.

E. Air free of the oxidized particulates rises through the air treatment region and escapes at channel 91 to re-enter the atmosphere.

The above apparatus may be operated indoors, since the exiting air flow is essentially free of undesirable particulates. Alternatively, it can of course be operated out-of-doors, preferably with an appropriate rain shield (not shown) protecting the electrode node body, receptor and other potentially vulnerable components of the apparatus. Additionally, two or more apparatus units 10 may be grouped or linked in tandem using a canopy to collect and recirculate the air output from channel 91, to act as a failsafe structure should any one of the units fail. In an alternative embodiment, two or more apparatus 10 are linked in tandem by collecting the air output from a first apparatus using a canopy extending over channel 91, and feeding the collected air output into inlets 100 of a second apparatus.

Fullerenes can be produced using the present apparatus and collected from reservoir 68. Preferably, when it is desirable to produce a fullerene, a very clean hydrocarbon source (such as jet fuel or paraffin) is burned and treated by apparatus 10 in order to minimize the presence of impurities in the fullerene final product. The fullerenes produced, including $C_{60}$, $C_{70}$, $C_{84}$ and $C_{120}$, may be segregated using conventional means.

While it is believed that the important and unexpected results achieved in the apparatus and method of the invention are the result of the production of elemental hydrogen produced at the tips of the point source electrodes by unipolar ionization, which very actively reduces the oxidized particles, applicants do not intend to be limited in the coverage of the present invention to any theory of its operation. With this in mind, applicant suggests the following possible mechanism for sulfur dioxide reduction in accordance with the invention, with other materials such as carbon, iron, silver, copper, etc. being converted to their elemental form by a like mechanism.

$$H_2O = OH^- + H^+$$

$$H^+ + e^- = H$$

$$4OH^- - 4e^- = O_2 + 2H_2O$$

$$6H + SO_2 = H_2S + 2H_2O$$

$$SO_2 + 2H_2S = 3S\downarrow + 2H_2O$$

Or $$SO_2 + 4H = S\downarrow + 2H_2O$$

Similarly, carbon dioxide may be reduced according to the present mechanism:

$$4H + CO_2 = C\downarrow + 2H_2O$$

$$CO_2 + 8H = CH_4 + 2H_2O$$

$$CH_4 + CO_2 = 2C\downarrow + 2H_2O$$

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for treating an air flow containing particulates and/or oxidized compounds of carbon, sulfur, iron, and other elements, comprising:
   a receptor having an inner surface;
   an electrode node having a body with an outer surface spaced from the inner surface of the receptor to define a reaction zone between the outer surface of the body and the inner surface of the receptor;
   a plurality of electrically conductive point source electrodes projecting from the body of the electrode node into the reaction zone;
   the electrode node and the receptor being electrically isolated from each other and the inner surface of the receptor being connected to ground;
   a voltage source electrically connected to the electrode node; and
   means for introducing the air flow into the reaction zone.

2. The apparatus of claim 1 in which the electrode node body comprises a series of interconnected electrically conductive frames.

3. The apparatus of claim 2 in which conductive tiles are mounted on the frames to produce a cone-shaped structure.

4. The apparatus of claim 3 in which the point source electrodes project from the tile surfaces into the reaction zone.

5. The apparatus of claim 1 in which the electrode node body has an inner surface that is covered with electrically conductive material.

6. The apparatus of claim 5 in which the electrically conductive material is an aluminum foil.

7. The apparatus of claim 1 in which the point source electrodes are integrated in a common electrical circuit.

8. The apparatus of claim 1 in which the point source electrodes are needle electrodes.

9. The apparatus of claim 8 in which the spacing between adjacent needles is no less than about 20 mm and no more than about 45 mm.

10. The apparatus of claim 8 in which the electrode node body has an outer surface area of about 22 $m^2$ with approximately 17,000 needles of about 0.35 mm diameter projecting from its surface, the needles being spaced at about 22 mm between adjacent needles.

11. The apparatus of claim 8 in which shafts of the needles protrude about 40 mm from the outer surface of the body of the electrode node.

12. The apparatus of claim 1 in which the voltage source is a transformer.

13. The apparatus of claim 12 in which the transformer provides a voltage in the range of about 10-3,000 kV through a rectifier.

14. The apparatus of claim 12 in which the transformer produces a voltage in the range of about 300 kV and a current of about 250 mA, through a rectifier.

15. The apparatus of claim 1 in which the receptor is funnel-shaped, having a conical inclined inner surface.

16. The apparatus of claim 15 including a means for supplying a continuous film of electrically-grounded water on the inner surface of the receptor.

17. The apparatus of claim 16 in which the outer edge of the receptor is encircled by an annular trough continuously supplied with water that spills over the outer edge of the funnel receptor to supply the continuous film of water.

18. The apparatus of claim 16 in which the inner surface of the receptor carrying the water film is covered with an insulating coating.

19. The apparatus claim 18 in which the insulating coating is an epoxy filled with dielectric particles.

20. The apparatus of claim 16 including means for collecting the water traveling over the inner surface of the receptor and means to filter the collected water to remove particulates and elemental material.

21. The apparatus of claim 20 including an air flotation system for filtering the collected water.

22. The apparatus of claim 1 in which the reaction zone is about 5 m in thickness.

23. The apparatus of claim 1 including means for moving the electrode node body with respect to the receptor in order to vary thickness of the reaction zone.

24. The apparatus of claim 1 in which the electrode node body and receptor are bowl-shaped.

25. The apparatus of claim 1 in which the corresponding outer surface of the electrode node body and the inner surface of the receptor are substantially equidistant from each other and the electrode node body and receptor are symmetrically disposed about a common axis.

26. The apparatus of claim 1 including means for recycling the air flow introduced into the reaction zone.

27. The apparatus of claim 1 including means for introducing the air flow from the lower part of the receptor.

28. The apparatus of claim 1 including means for accelerating the air flow as it enters the reaction zone.

* * * * *